United States Patent
Steckl et al.

(10) Patent No.: US 6,972,516 B2
(45) Date of Patent: Dec. 6, 2005

(54) PHOTOPUMP-ENHANCED ELECTROLUMINESCENT DEVICES

(75) Inventors: Andrew J. Steckl, Cincinnati, OH (US); Dong-Seon Lee, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 410 days.

(21) Appl. No.: 10/172,294

(22) Filed: Jun. 14, 2002

(65) Prior Publication Data

US 2003/0230970 A1    Dec. 18, 2003

(51) Int. Cl.$^7$ .............................. H01J 1/62; H01J 63/04
(52) U.S. Cl. ..................... 313/498; 313/501; 313/507
(58) Field of Search ..................... 313/498, 504–509, 313/501, 502, 523, 539

(56) References Cited

U.S. PATENT DOCUMENTS

| | | | |
|---|---|---|---|
| 5,432,808 A * | 7/1995 | Hatano et al. ................. | 257/77 |
| 5,548,137 A * | 8/1996 | Fan et al. ..................... | 257/191 |
| 5,583,351 A * | 12/1996 | Brown et al. ................. | 257/89 |
| 5,585,648 A * | 12/1996 | Tischler ....................... | 257/77 |
| 5,739,554 A * | 4/1998 | Edmond et al. ............. | 257/103 |
| 5,751,021 A * | 5/1998 | Teraguchi .................... | 257/103 |
| 5,898,185 A * | 4/1999 | Bojarczuk et al. .......... | 257/103 |
| 5,966,393 A | 10/1999 | Hide et al. .................... | 372/23 |
| 6,069,440 A | 5/2000 | Shimizu et al. ............. | 313/486 |
| 6,120,909 A * | 9/2000 | Bojarczuk et al. .......... | 313/506 |
| 6,160,273 A | 12/2000 | Fork et al. .................... | 257/98 |
| 6,169,359 B1 * | 1/2001 | Sun et al. ..................... | 313/503 |
| 6,255,669 B1 * | 7/2001 | Birkhahn et al. ............ | 257/89 |
| 6,258,617 B1 * | 7/2001 | Nitta et al. ................... | 438/46 |
| 6,605,895 B2 * | 8/2003 | Hori et al. .................... | 313/506 |
| 6,713,954 B2 * | 3/2004 | Wakahara et al. .......... | 313/506 |

OTHER PUBLICATIONS

J. Heikenfeld, M. Garter, D.S. Lee, R. Birkhahn and A.J. Steckl, *Red Light Emission by Photoluminescence and Electroluminescence from Eu-Doped GaN*, Applied Physics Letters, vol. 75, No. 9, pp. 1189-1191 (Aug. 30, 1999).

D.S. Lee, J. Heikenfeld, R. Birkhahn, M. Garter, B.K. Lee and A.J. Steckl, *Voltage-Controlled Yellow or Orange Emission from GaN Codoped with Er and Eu*, Applied Physics Letters, vol. 76, No. 12, pp. 1525-1527 (Mar. 20, 2000).

A.J. Steckl, J. Heikenfeld, D.S. Lee, M. Garter, *Multiple Color Capability from Rare Earth-Doped Gallium Nitride*, Materials Science and Engineering B81 (2001), pp. 97-101.

D.S. Lee and A.J. Steckl, *Lateral Color Integration on Rare-Earth-Doped GaN Electroluminescent Thin Films*, Applied Physics Letters, vol. 80, No. 11, pp. 1888-1890 (Mar. 18, 2002).

(Continued)

*Primary Examiner*—Joseph Williams
*Assistant Examiner*—Peter Macchiarolo
(74) *Attorney, Agent, or Firm*—Wood, Herron & Evans, L.L.P.

(57) ABSTRACT

An electroluminescent device in which the intensity of the light emission is enhanced by photopumping with radiation from a radiation source of a suitable photon energy. The photopumping radiation from the radiation source interacts with the wide band-gap semiconductor forming the electroluminescent device so as to, when the device is electrically biased to provide light emission, generate additional carriers that enhance the intensity of the light emission from a light-emitting element present in the wide band-gap semiconductor. A waveguide structure may be integrated into a substrate carrying the electroluminescent device for transferring the radiation from the radiation source to the electroluminescent device. Multiple electroluminescent devices may be arranged in pixels for forming a flat panel display in which certain of the devices are photopumped with radiation.

42 Claims, 6 Drawing Sheets

OTHER PUBLICATIONS

Jason Heikenfeld and Andrew J. Steckl, *Electroluminescent Devices Using a High-Temperature Stable GaN-Based Phosphor and Thick-Film Dielectric Layer*, IEEE Transactions on Electron Devices, vol. 49, No. 4, pp. 557-563 (Apr. 2002).

D.S. Lee et al., *Optimum Er Concentration for In Situ Doped GaN Visible and Infrared Luminescence*, Applied Physics Letters, vol. 79, No. 6, pp. 719-721 (Aug. 6, 2001).

D.S. Lee, J. Heikenfeld, A.J. Steckl, *Growth-Temperature Dependence of Er-Doped GaN Luminescent Thin Films*, Applied Physics Letters, vol. 80, No. 3, pp. 344-346 (Jan. 21, 2002).

D.S. Lee and A.J. Steckl, *Ga Flux Dependence of Er-Doped GaN Luminescent Thin Films*, Applied Physics Letters, vol. 80, No. 5, pp. 728-720 (Feb. 4, 2002).

E. Calleja et al., *Luminescence Properties and Defects in GaN Nanocolumns Grown by Molecular Beam Epitaxy*, Physical Review B (PRB), vol. 62, No. 24, pp. 16826-16834 (Dec. 15, 2000).

A.J. Steckl and R. Birkhahn, *Visible Emission from Er-Doped GaN Grown by Solid Source Molecular Beam Epitaxy*, Applied Physics Letters, vol. 73, No. 12, pp. 1700-1702 (Sep. 21, 1998).

A.J. Steckl, M. Garter, D.S. Lee, J. Heikenfeld and R. Birkhahn, *Blue Emission from Tm-Doped GaN Electroluminescent Devices*, Applied Physics Letyters, vol. 75, No. 15, pp. 2184-2186 (Oct. 11, 1999).

D.S. Lee and A.J. Steckl, *Room-Temperature Grown Rare-Earth-Doped GaN Luminescent Thin Films*, Applied Physics Letters, vol. 79, No. 13, pp. 1962-1964 (Sep. 24, 2001).

A.J. Steckl and J.M. Zavada, *Optoelectronic Properties and Applications of Rare-Earth-Doped GaN*, MRS Bulletin, Sep. 1999, pp. 33-38.

R. Birkhahn and A.J. Steckl, *Green Emission from Er-Doped GaN Grown by Molecular Beam Epitaxy on Si Substrates*, Applied Physics Letters, vol. 73, No. 15, pp. 2143-2145 (Oct. 12, 1998).

\* cited by examiner

PHOTOPUMP-ENHANCED ELECTROLUMINESCENT DEVICES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DAAD19-99-1-0348 awarded by The Army Research Office.

FIELD OF THE INVENTION

The present invention relates to light-emissive electroluminescent devices and, in particular, to apparatus and methods for enhancing the light emission from light emissive electroluminescent devices based upon wide band-gap semiconductors doped with a rare-earth element.

BACKGROUND OF THE INVENTION

Flat panel displays possess a large potential market in a variety of commercial products that emit visible light, including computer displays, flat screen TVs, industrial displays, medical displays, and automotive displays. Light emissive flat panel displays generally include a layered structure patterned to provide a rectangular array of light-emissive devices arranged in multiple rows and columns. To form an image, individual light-emissive devices from among the matrix array are energized to radiate visible light of a characteristic wavelength when lit and are nominally dark when in an unenergized state. To display an image in color, multiple matrix arrays of active elements or sub-pixels are interleaved to provide an arrangement suitable to provide the requisite coordinated emission of blue, green and red light. Typically, an individual pixel of the display comprises one blue sub-pixel, one green sub-pixel and one red sub-pixel arranged with a proximate relationship so that the respective light emissions combine to produce light of an additive color mixture visible to an observer.

Wide band-gap semiconductors possess many advantages for the fabrication of light-emissive electroluminescent devices when compared with other semiconductors and glasses. Among those advantages are chemical stability, carrier generation for exciting the luminescence centers in the material, and physical stability over a wide range of temperatures. Visible emission has been observed in light-emissive electroluminescent devices fabricated from the wide band-gap semiconductor gallium nitride doped with a rare-earth impurity. In particular, the three primary colors may be realized in gallium nitride by doping with Eu to produce red emission, with Er to produce green emission, and with Tm to produce blue emission. Emission in other colors from rare-earth-doped gallium nitride electroluminescent devices may be produced by uniform co-doping during growth with multiple rare earth impurities. For example, turquoise emission results from co-doping gallium nitride with respective concentrations of Er and Tm and orange or yellow emission results from gallium nitride co-doped with Er and Eu. Therefore, rare-earth-doped gallium nitride electroluminescent devices may be used to form multi-color flat panel displays.

However, the brightness and efficiency of the emission from conventional light-emissive electroluminescent devices may be deficient for flat panel displays, especially those operating in relatively high luminosity background conditions. In particular, blue light emission is the most difficult color to obtain with sufficient brightness and efficiency among the three primary colors. Blue photons constitute the highest energy photon from among photons providing the three primary colors and, therefore, require the most energy to generate. In addition, the human eye is less sensitive to blue light than to red or green light. As a result, the overall color balance of the flat panel display suffers unless the light intensity emitted from the blue-emitting electroluminescent device is somehow increased. Generally, the blue light emission may be increased only if either the blue-emitting electroluminescent device is driven harder than the red-emitting and green-emitting devices, which reduces the device lifetime, or the area of the blue-emitting electroluminescent device is larger than the areas of the red-emitting and green-emitting devices, which reduces the spatial resolution of the flat panel display. In certain flat panel display applications, the intensities of the blue and/or green emission may also lack sufficient brightness and efficiency for clear visibility.

Therefore, there is a need for light-emissive electroluminescent devices having enhanced light emission without overdriving or enlarging the device structure and a method of increasing the intensity of the light emission from light-emissive electroluminescent devices.

SUMMARY OF THE INVENTION

According to one embodiment of the invention, a light-emissive device is provided that includes an electroluminescent layer formed of a wide band-gap semiconductor doped with a concentration of a light-emitting element effective to provide light emission and an optically-transmissive electrode formed on the electroluminescent layer. A source of bias potential is electrically coupled to the electrode for providing a bias potential effective to produce light emission from the light-emitting element of the electroluminescent layer. A radiation source provides radiation to the electroluminescent layer through the optically-transmissive electrode at a power effective to increase the intensity of the light emission from the light-emitting element.

According to another embodiment of the invention, a light-emissive device is provided that includes first and second electrodes, of which at least one of the first and second electrodes is optically transmissive, and an electroluminescent layer disposed between the first and second electrodes. The electroluminescent layer includes a wide band-gap semiconductor doped with a light-emitting element in a concentration effective to provide light emission transmitted through the transparent one of the first and second electrodes. A source of bias is potential electrically coupled to the first and second electrodes for providing a bias potential effective to produce light emission from the light-emitting element of the electroluminescent layer. A radiation source provides radiation to the electroluminescent layer through the optically-transmissive electrode at a power effective to increase the intensity of the light emission from the light-emitting element.

According to yet another embodiment of the invention, a light-emissive device is provided that includes first, second and third electrodes, of which the second and third electrodes are optically transmissive, a first electroluminescent layer disposed between the first and second electrodes, and a second electroluminescent layer disposed between the first and third electrodes. A source of bias potential is electrically coupled to the first, second and third electrodes for providing respective bias potentials effective to produce light emission from the first and the second electroluminescent layers. A radiation source provides radiation at a power effective to increase the intensity of the light emission from the first and the second electroluminescent layers. A dielectric layer disposed between the first electrode and the first and the second electroluminescent layers is capable of transferring radiation from the radiation source to the first and second electroluminescent layers. A blocking layer is disposed between the dielectric layer and the first and the second electroluminescent layers. The blocking layer is operative to prevent the passage of radiation from the dielectric layer to the first electroluminescent layer and operative to permit the passage of radiation from the dielectric layer to the second electroluminescent layer.

According to principles of the invention, photopumping enhances the visible and infrared electroluminescent emission from wide band-gap semiconductors doped with a dopant in a concentration suitable to supply luminescent centers. Photopumping can be achieved using readily available excitation sources, such as a HeCd laser (~3.8 eV) commonly used as an above-band gap excitation source for gallium nitride photoluminescence. Photopumping enhances the brightness of the electroluminescent device by as much as two orders of magnitude, depending on the applied bias and the photopumping power. Photopumping enhances not only the brightness of the electroluminescent device but also the emission efficiency. Therefore, the principles of the invention are generally applicable to light-emissive electroluminescent devices used in color flat panel displays and operate to increase the brightness and color balance of the displayed images. The principles of the invention are also applicable to light-emissive electroluminescent devices used in ultraviolet indicators and ultraviolet detectors.

The objects and advantages of the invention will be further appreciated in light of the following detailed description and drawings in which:

DETAILED DESCRIPTION

Figure 1:
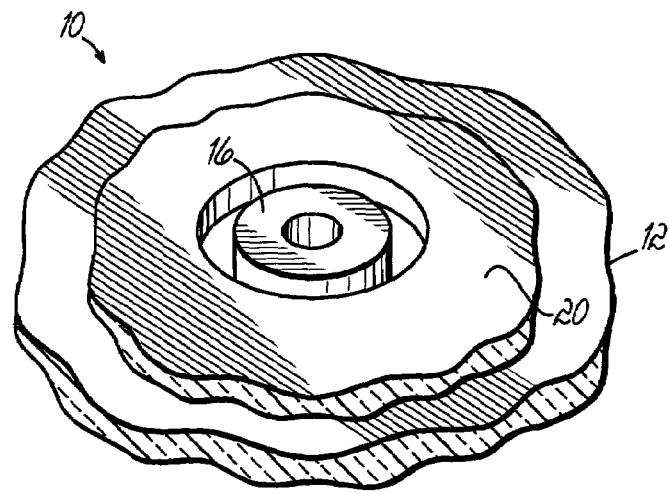
FIG. 1 is a diagrammatic perspective view illustrating a direct current-driven, light-emissive electroluminescent device according to the principles of the invention.
Figure 2A:
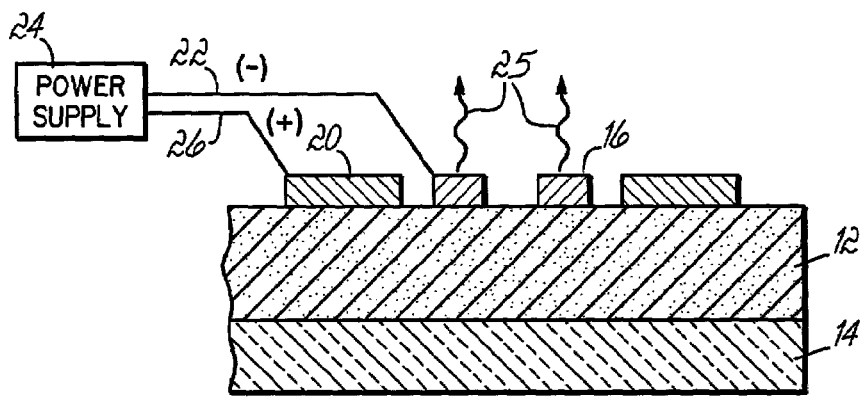
FIGS. 2A and 2B are schematic cross-sectional views of the light-emissive electroluminescent device of FIG. 1 operating, respectively, without photopumping and with photopumping according to the principles of the invention.
Figure 2B:
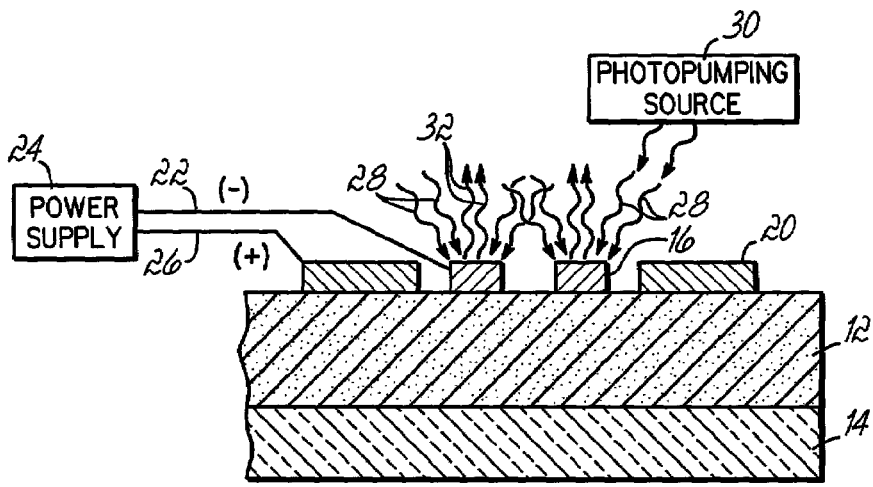

With reference to FIGS. 1 and 2A–2B, an electroluminescent device 10 according to the principles of the invention includes a semiconductor phosphor layer 12 formed on an exposed surface of a substrate 14 and a transparent ring-shaped contact or electrode 16 formed on an exposed surface of the semiconductor phosphor layer 12. The substrate 14 may be any suitable substrate material having a smooth, relatively flat surface finish and a relatively low defect density as understood by persons of ordinary skill in the art. Suitable substrates include, but are not limited to, gallium nitride, silicon, silicon carbide, silica, glass, quartz, sapphire, alumina, titania, and other ceramics apparent to persons of ordinary skill in the art.

With continued reference to FIGS. 1 and 2A–2B, the semiconductor phosphor layer 12 may be any wide band-gap semiconductor material doped with an impurity or a dopant supplying luminescent centers at a concentration effective to produce light emission at one or more wavelengths. The wide band-gap semiconductor may be any semi-insulating or semi-conducting material that can generate a large enough electric field strength to experience breakdown for photogenerating carriers to excite the luminescence centers provided by the dopant. Suitable wide band-gap semiconductors have a band gap greater than or equal to about 2 eV and include III-V compounds such as gallium nitride, aluminum nitride, and gallium phosphide, II-VI compounds such as cadmium sulfide, zinc telluride, zinc oxide, zinc sulfide and zinc selenide, strontium sulfide, calcium sulfide, and IV—IV compounds such as silicon carbide. The wide band-gap semiconductor may be an alloy of two or more semiconductor materials having an effective band gap large enough for visible light emission. It is appreciated that the individual semiconductor materials in the alloy may have a band gap insufficient for visible light emission and have a large enough band gap when combined for visible light emission.

The dopant may be any element having a partially filled inner shell with electronic transition levels that can result in light emission at one or more visible, infrared or ultraviolet wavelengths when incorporated into a wide band-gap semiconductor. Suitable dopants include elements selected from the Periodic Table, such as elements from the Transition metal series including chromium and manganese, and Rare Earth elements from, for example, the Lanthanide metal series. Typically, the elemental concentration of the dopant ranges from about 0.1 at. % to about 10 at. %.

Among the typical semiconductor phosphor layers 12 are gallium nitride (GaN), aluminum nitride (AlN), and alloys of GaN, AlN and indium nitride (InN) or (Ga, Al, In)N doped with one or more rare-earth dopants, such as rare earth elements selected from among the Lanthanide Series of the Periodic Table including cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb). The most typical rare-earth dopants incorporated into GaN, AlN, and (Ga, Al, In)N to form a semiconductor phosphor are Eu for red light emission, Er for green light emission, and Tm for blue light emission.

Any conventional deposition technique capable of forming a thin film of a semiconductor material can be used to form the semiconductor phosphor layer 12 on the substrate 14. Suitable deposition techniques include, but are not limited to, molecular beam epitaxy (MBE), metalorganic chemical vapor deposition (MOCVD), organometallic vapor phase epitaxy (OMVPE), hydride vapor phase epitaxy (HVPE), chemical vapor deposition (CVD), plasma enhanced chemical vapor deposition (PECVD), physical deposition by sputtering or evaporation, and laser ablation. Thick film formation techniques, such as screen printing, spin-on deposition, and dipping techniques, may also be utilized. The dopant species can be incorporated into the semiconductor material during deposition by in situ methods or introduced post-deposition by a conventional technique such as ion implantation or diffusion.

In a specific embodiment of the invention, the semiconductor phosphor layer 12 is gallium nitride doped with a concentration of a rare-earth dopant (RE-doped GaN) suitable to provide the desired wavelength(s) of light emission and formed on substrate 14 by an MBE process in an MBE process chamber. To that end, molecular beams of gallium and the rare-earth dopant are supplied by effusion cells and a molecular beam of nitrogen radicals, and other species, is generated from a suitable nitrogenous process gas by a radio frequency (RF) plasma source. A flow of a suitable nitrogenous process gas, typically $N_2$, is provided to the RF plasma source at a flow rate ranging from about 1.2 standard cubic centimeters per minute (sccm) to about 1.8 sccm, typically about 1.5 sccm. Electrically coupled with the RF plasma source is an RF power supply operative to provide RF power at between about 300 W to about 500 W, typically about 400 W, and at a typical excitation frequency of 13.56 MHz.

The molecular beams are directed concurrently toward the exposed surface of the substrate 14, which is heated to a suitable deposition temperature, where the gallium and the rare earth molecular beams combine with nitrogen radicals to form or deposit the semiconductor phosphor layer 12. Typically, a buffer layer of gallium nitride is deposited on substrate 14 for about 1 minute to about 5 minutes, the RE-doped GaN is deposited on the buffer layer for about 30 minutes to about 60 minutes, and a gallium nitride cap layer is deposited on the RE-doped GaN for about 1 minute to about 5 minutes. The total film thickness is typically between about 0.5 µm to about 1 µm, with the RE-doped GaN contributing between about 0.4 µm to about 0.8 µm to the total thickness.

The RE-doped GaN is doped with an impurity concentration of Eu suitable to provide a semiconductor phosphor layer capable of emitting red light when biased, with an impurity concentration of Er suitable to provide a semiconductor phosphor layer capable of emitting green light, or when biased with an impurity concentration of Tm suitable to provide a semiconductor phosphor layer capable of emitting blue light when biased. The maximum impurity concentration in gallium nitride is limited only by the cessation of light emission. As examples, a typical impurity concentration for any of Eu, Er, and Tm in gallium nitride ranges from about 0.1 atomic percent to about 10 atomic percent.

The substrate temperature and the cell temperature of the gallium effusion cell depend upon the identity of the rare-earth dopant. As an example, for the rare-earth dopant Er, a suitable substrate temperature is between 500° C. to 700° C., typically about 600° C., a suitable gallium cell temperature is between about 900° C. to about 950° C., typically about 930° C., and a suitable Er cell temperature is in a range of about 840° C. to about 880° C., typically about 860° C. As another example, for the rare-earth dopant Eu, a suitable substrate temperature is between 400° C. to 600° C., typically about 500° C., a suitable gallium cell temperature is between about 900° C. to about 950° C., typically about 920° C., and a suitable Eu cell temperature is in a range of about 380° C. to 420° C., typically about 400° C. As yet another example, for the rare-earth dopant Tm, a suitable substrate temperature is between 400° C. to 600° C., typically about 500° C., a suitable gallium cell temperature is between about 890° C. to about 940° C., typically about 915° C., and a suitable Tm cell temperature is in a range of about 580° C. to 620° C., typically about 600° C.

With continued reference to FIGS. 1 and 2A–2B, the ring-shaped transparent electrode 16 is formed on the exposed surface of the semiconductor phosphor layer 12 by a deposition and a lift-off process. To that end, a photoresist layer (not shown) formed on the substrate 14 is exposed and developed to provide an opening suitable to create transparent electrode 16. A layer of an electrode material suitable to form the transparent electrode 16 is deposited on the patterned photoresist layer and, thereafter, the photoresist layer is removed by immersion in a solvent to lift-off the overlying electrode material leaving electrode 16. The transparent electrode 16 should have a high optical transmittance (e.g., greater than about 85%) over the whole visible light range of the electromagnetic spectrum. Indium-tin oxide is one material suitable for forming transparent electrode 16 and may be deposited by a sputter physical vapor deposition technique. The lift-off process also provides an outer contact or electrode 20 encircling the transparent electrode 16 with a generally concentric relationship. Typically, the area of the exposed surface of electrode 20 is significantly larger than the area of the exposed surface of electrode 16.

An electrical interconnect 22 electrically couples the transparent electrode 16 with the negative terminal of a direct current voltage source or power supply 24. Another electrical interconnect 26 electrically couples the outer electrode 20 with the positive terminal of the direct current voltage source 24. The application of a DC bias potential to the electrodes 16, 20 induces light emission in the form of an output beam, indicated diagrammatically by reference numeral 25 in FIG. 2A, from the semiconductor phosphor layer 12. The output beam 25 from semiconductor phosphor layer 12 is directed outwardly from the electroluminescent device 10 through the transparent electrode 16.

With continued reference to FIG. 2B and according to the principles of the invention, a beam of radiation, indicated diagrammatically by reference numeral 28, is directed from a photopumping source 30 to the semiconductor phosphor layer 12 through the transparent electrode 16 concurrently with the application of the DC bias potential from the direct current voltage source 24 to the electrodes 16, 20. The photopumping source 30 is any monochromatic or polychromatic source capable of providing the radiation beam 28 at a wavelength or band of wavelengths greater than the band gap of the wide band-gap semiconductor material of the semiconductor phosphor layer 12. Suitable photopumping sources 30 include HeCd lasers operating at a wavelength of about 325 nm, argon ion lasers, and frequency-doubled or frequency-quadrupled Nd:YAG lasers.

Generally, the radiation beam 28 includes high energy short wavelength photons, such as photons having ultraviolet wavelengths less than about 370 nm (i.e., a photon energy greater than about 3.4 eV), that photogenerate carriers by the wide band-gap semiconductor. The photogenerated carriers generated by the radiation beam 28 are additive with the carriers generated by the application of the bias potential from direct current voltage source 24. The carriers collectively excite the luminescent centers provided by the dopant and produce light emission in the form of an output beam, indicated generally by reference numeral 32, from the electroluminescent device 10. The output beam 32 may be at one or more wavelengths, each having a longer wavelength and lower photon energy than the radiation beam 28. Due to the additional carriers supplied by the photopumping, the output beam 32 has a significantly increased intensity or brightness potential over the output beam 25 (FIG. 2A) arising from the application of the DC bias alone. The brightness enhancement of the electroluminescent device 10 provided by the photopumping may be as great as a factor of about 100 depending on the bias potential applied by the direct current voltage source 24 and the laser power supplied in the radiation beam 28.

In use and with continued reference to FIG. 2B, a DC bias potential is applied by the direct current voltage source 24 between the transparent electrode 16 and the outer electrode 20. The radiation beam 28 is directed from the photopumping source 30 to the semiconductor phosphor layer 12 through the transparent electrode 16. The application of a DC bias potential and the radiation beam 28 cooperate to produce output beam 32 from the semiconductor phosphor layer 12. The output beam 32 from semiconductor phosphor layer 12 is directed outwardly from the electroluminescent device 10 through the transparent electrode 16.

It is appreciated that the electroluminescent device 10 may constitute a sub-pixel arranged with other electroluminescent devices 10 providing additional sub-pixels of complementary light emission to form a pixel in a matrix array of similar pixels forming a multi-color electroluminescent display. For example, three sub-pixels may provide respective red, green and blue light emission for forming one panel from among a matrix array of similar pixels of an RGB flat panel display. It is further appreciated that the principles of the invention may be utilized to enhance the light emission from any number of the individual sub-pixels in a pixel. In RGB flat panel displays, in particular, the principles of the invention may be used to enhance the emission from the blue-emitting electroluminescent device, although the present invention is not so limited.

Figure 3:
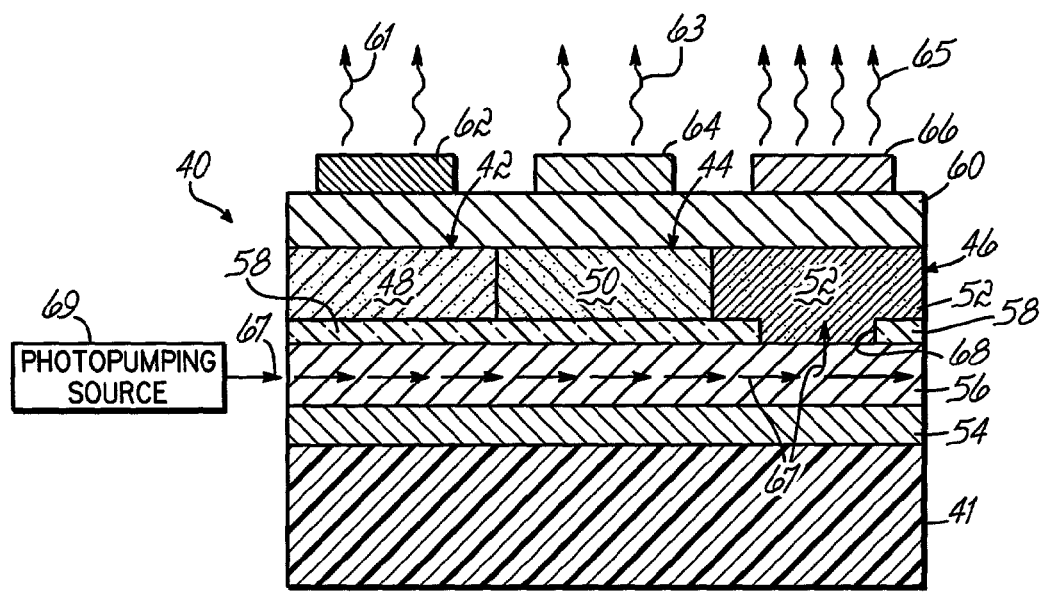
FIG. 3 is a schematic cross-sectional view of a pixel of an alternating current-driven electroluminescent flat panel display according to the principles of the invention.

With reference to FIG. 3 and according to one embodiment of the invention, a single pixel 40 is shown from among a matrix array of pixels, each similar to pixel 40, constituting an AC-driven thin film electroluminescent flat panel display. The pixel 40 is carried by a substrate 41 similar to substrate 14 (FIG. 1). The pixel 40 consists of three adjacent electroluminescent devices or sub-pixels 42, 44 and 46 of which the light emission of sub-pixel 46 is selectively enhanced by photopumping according to the principles of the invention. Subpixel 42 includes a semiconductor phosphor layer 48 tailored for emitting light of a first wavelength or band of wavelengths, sub-pixel 44 includes a semiconductor phosphor layer 50 tailored for emitting light of a second wavelength or band of wavelengths, and sub-pixel 46 includes a semiconductor phosphor layer 52 tailored for emitting light of a third wavelength or band of wavelengths. Light emitted by the three sub-pixels 42, 44, 46 is additively mixed to provide multiple visible output colors. The semiconductor phosphor layers 48, 50, and 52 may be any wide band-gap semiconductor material doped with an impurity or a dopant supplying luminescent centers suitable to produce light emission at one or more wavelengths, as described herein. For example, semiconductor phosphor layer 48 of sub-pixel 42 may be GaN doped with Eu for emitting red light when biased, semiconductor phosphor layer 50 of sub-pixel 44 may be GaN doped with Er for emitting green light when biased, and semiconductor phosphor layer 52 of sub-pixel 46 may be GaN doped with Tm for emitting blue light when biased.

With continued reference to FIG. 3, pixel 40 further includes a bottom electrode 54 formed on substrate 41, a bottom dielectric layer 56 formed on bottom electrode 54, and a blocking layer 58 formed on the bottom dielectric layer 56. A top dielectric layer 60 is formed above the semiconductor phosphor layers 48, 50, and 52 and respective transparent electrodes 62, 64, and 66 are provided on the top dielectric layer 60. The semiconductor phosphor layers 48, 50, and 52 are positioned between the blocking layer 58 and the top dielectric layer 60. The transparent electrodes 62, 64, and 66 are spaced apart at locations corresponding to respective ones of the sub-pixels 42, 44 and 46.

According to principles of the invention, the bottom dielectric layer 56, which functions as a dielectric in the layered structure of the pixel 40, also operates as a waveguide layer for guiding a radiation beam, indicated diagrammatically by arrows 67, effective for photopumping from a photopumping source 69. Photopumping source 69 is similar to photopumping source 30. The bottom dielectric layer 56 is formed of any dielectric material that is transparent to radiation having a wavelength suitable for providing the photopumping. The dielectric material forming bottom dielectric layer 56 also must have a higher refractive index (RI) than the bottom electrode 54 and the blocking layer 58 in order to guide the photopumping light by total internal reflection.

The blocking layer 58 is made of any material capable of blocking the passage of radiation beam 67 and thereby normally isolating the semiconductor phosphor layers 48, 50, and 52 from the photons of the radiation beam 67 guided by the bottom dielectric layer 56. Typically, radiation beam 67 has a wavelength in the ultraviolet region of the electromagnetic spectrum (less than about 370 nm or greater than a photon energy of about 3.4 eV) and blocking layer 58 is made of any dielectric material capable of blocking the passage of ultraviolet radiation, such as a dielectric material having a lesser refractive index than the bottom dielectric layer 56. For example, bottom dielectric layer 56 may be formed from dielectric materials including, but not limited to, $Ta_2O_5$ (RI: about 2.3), $TiO_2$ (RI: about 2.5 to about 2.7) or $LiNbO_3$ (RI: about 2.4), the blocking layer 58 may be formed from dielectric materials including, but not limited to, $SiO_2$ (RI: about 1.46) or $Al_2O_3$ (RI: about 1.7), and the bottom electrode 54 may be formed from electrically conductive materials including, but not limited to, indium-tin oxide (RI: about 2.2) or any metal.

With continued reference to FIG. 3, an opening 68 is formed in the blocking layer 58 in a location underlying the semiconductor phosphor layer 52 of sub-pixel 46. The dimensions of opening 68 regulate the amount of radiation beam 67 admitted to the semiconductor phosphor layer 52 from the bottom dielectric layer 56 and, therefore, regulate the level of photopumping available for increasing the intensity of the light emitted by sub-pixel 46. It is appreciated that openings similar to opening 68 may be provided in the blocking layer 58 in locations beneath one or both of the other semiconductor phosphor layers 48, 50 for enhancing the light emission from sub-pixels 42, 44. The wide band-gap semiconductor forming the phosphor layer 52 must have a refractive index greater than the refractive index of the bottom dielectric layer 56 to allow the transfer of radiation beam 67. For example, if gallium nitride (RI: about 2.8 at 3.4 eV) is selected as the wide band-gap semiconductor, the bottom dielectric layer 56 would need to have a refractive index less than about 2.8.

In use and with reference to FIG. 3, an AC electrical bias is selectively applied between the bottom electrode 54 and each of the transparent electrodes 62, 64, and 66. The AC electrical bias generates light emission or output beams, as diagrammatically indicated by reference numerals 61, 63, and 65, respectively from each of the respective sub-pixels 42, 44 and 46. The output beams 61, 63, and 65 are emitted outwardly from pixel 40 through the top dielectric layer 60 and the transparent electrodes 62, 64, and 66. Photons from radiation beam 67 are admitted to the semiconductor phosphor layer 52 through opening 68 from the bottom dielectric layer 56. The selective transfer of photons from radiation beam 67 occurs because the refractive index of the phosphor layer 52 is greater than the refractive index of the bottom dielectric layer 56. The carriers generated in the semiconductor phosphor layer 52 by photons from radiation beam 67 are additive with the carriers generated by the application of a bias potential from the AC electrical bias. The photopumping provided by the radiation beam 67 from photopumping source 69 enhances the intensity or brightness of the output beam 65 as compared with the application of the AC electrical bias alone. It is appreciated that photons from the radiation beam 67 are also transferred to other pixels, similar to pixel 40, in the flat panel display.

Conventional control circuitry (not shown) is provided for coordinating the operation of pixel 40 with a matrix array of other similar pixels for operating a multi-color electroluminescent display. In particular, the individual pixels and constituent sub-pixels are coupled between intersecting sets of row and column address lines and addressed in a multiplexed fashion. The control circuitry is operative to regulate the current through each sub-pixel of the electroluminescent display, in accordance with an applied drive signal.

Figure 4:
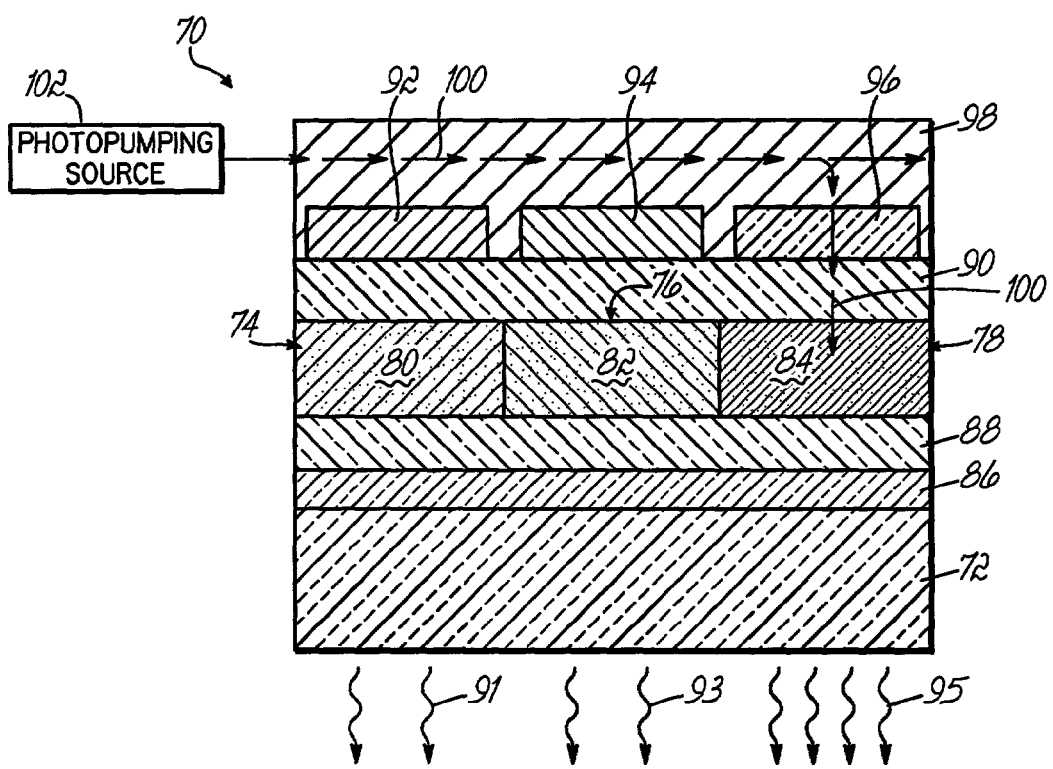
FIG. 4 is a schematic cross-sectional view of a pixel of another alternating current-driven electroluminescent flat panel display according to the principles of the invention.

With reference to FIG. 4 and according to the principles of the invention, a single pixel 70 is shown from among a matrix array of pixels, each similar to pixel 70, constituting an AC-driven thin film electroluminescent flat panel display. Pixel 70 is carried by a substrate 72, such as glass or sapphire, that is transmissive of radiation emitted by the pixel 70 without significant absorption. Pixel 70 includes three adjacent electroluminescent devices or sub-pixels 74, 76 and 78 of which the light emission of sub-pixel 78 is selectively enhanced by photopumping according to the principles of the invention. Sub-pixel 74 includes a semiconductor phosphor layer 80 tailored for emitting light of a first wavelength or band of wavelengths, sub-pixel 76 includes a semiconductor phosphor layer 82 tailored for emitting light of a second wavelength or band of wavelengths, and sub-pixel 78 includes a semiconductor phosphor layer 84 tailored for emitting light of a third wavelength or band of wavelengths. Light output by the three sub-pixels 74, 76, 78 is additively mixed to provide multiple visible output colors. The semiconductor phosphor layers 80, 82, and 84 may be any wide band-gap semiconductor material doped with an impurity or a dopant supplying luminescent centers suitable to produce light emission at one or more wavelengths, as described herein. For example, semiconductor phosphor layer 80 of sub-pixel 74 may be GaN doped with Eu for emitting red light when biased, semiconductor phosphor layer 82 of sub-pixel 76 may be GaN doped with Er for emitting green light when biased, and semiconductor phosphor layer 84 of sub-pixel 78 may be GaN doped with Tm for emitting blue light when biased.

With continued reference to FIG. 4, pixel 70 includes a bottom electrode 86 formed on substrate 72 and a bottom dielectric layer 88 formed on the bottom electrode 86. The bottom electrode 86 and the bottom dielectric layer 88 may be formed of any material that is highly transmissive of radiation in at least the visible portion of the electromagnetic spectrum. The bottom electrode 86 may be formed, for example, from indium-tin oxide. The semiconductor phosphor layers 80, 82, and 84 are formed on the bottom dielectric layer 88 and covered by a top dielectric layer 90. Optically opaque electrodes 92 and 94 are provided at respective locations on the top dielectric layer 90 corresponding to the locations of the semiconductor phosphor layer 80 of sub-pixel 74 and the semiconductor phosphor layer 82 of sub-pixel 76. Electrodes 92 and 94 may be formed, for example, from a metal such as aluminum or a metal alloy. A transparent electrode 96 is positioned at a location corresponding to the semiconductor phosphor layer 84 of sub-pixel 78. The transparent electrode 96 and top dielectric layer 90 are formed from any material that is highly transmissive of radiation in at least a portion of the electromagnetic spectrum suitable for photogeneration of carriers by the wide band-gap semiconductor of the semiconductor phosphor layer 84. In particular, the top dielectric layer 90 may be formed from $Ta_2O_5$, $TiO_2$, $LiNbO_3$, $Y_2O_3$, or $Al_2O_3$, and the transparent electrode 96 may be formed from indium-tin oxide that are each substantially transparent to radiation of ultraviolet wavelengths from, for example, a HeCd laser which is particularly well suited for producing photogenerated carriers in the wide band-gap semiconductor gallium nitride.

According to the principles of the invention, a waveguide layer 98 is provided superjacent or overlying the electrodes 92, 94, and 96. The waveguide layer 98 is operative for guiding or transferring a radiation beam, indicated diagrammatically by arrows 100, effective for photopumping from a photopumping source 102 to the position of sub-pixel 78. For example, the waveguide layer 98 may be formed from $SiO_2$ having a refractive index of 1.46. It is appreciated that the waveguide layer 98 also operates as a passivation layer for the pixel 70. Photons from the radiation beam 100 are redirected from the waveguide layer 98 into the transparent electrode 96 and transmitted through the top dielectric layer 90. The redirection that transfers photons from radiation beam 100 to the semiconductor phosphor layer 84 occurs because the transparent electrode 96 and the top dielectric layer 90 each have a refractive index greater than the refractive index of the waveguide layer 98. The wide band-gap semiconductor of the semiconductor phosphor layer 84 converts the photons from radiation beam 100 into carriers. Photopumping source 102 is similar to photopumping sources 30 and 69.

In use and with continued reference to FIG. 4, an AC electrical bias is selectively applied between the bottom electrode 86 and each of the electrodes 92, 94, and 96 to generate light emission or output beams, as diagrammatically indicated by reference numerals 91, 93, and 95, from the respective sub-pixels 74, 76 and 78 of pixel 70. Conventional circuitry (not shown) is provided for coordinating the operation of pixel 70 with a matrix array of other similar pixels for operating a multi-color electroluminescent display. Radiation beam 100 is conveyed within the waveguide layer 98 from the photopumping source 102 to the location of the transparent electrode 96. To that end, photons from the radiation beam 100 are redirected through the transparent electrode 96 and top dielectric layer 90 and enter the semiconductor phosphor layer 84 of sub-pixel 78. The carriers photogenerated by the radiation beam 100 are additive with the carriers generated by the application of a bias potential from the AC electrical bias. The photopumping by the radiation beam 100 enhances the intensity of the output beam 95 as compared with the application of the AC electrical bias alone.

It is appreciated that the principles of the invention are most applicable to enhancing light emission from sub-pixels emitting visible radiation at blue wavelengths in multi-color electroluminescent displays because blue is still the most difficult color to obtain with sufficient brightness and efficiency among the three primary colors. However, the present invention is not so limited in that the principles of the invention are generally applicable for sub-pixels in a flat panel display or other light-emissive electroluminescent devices regardless of the specific wavelength or range of wavelengths of the light emitted. In addition, the invention may improve the overall color balance of the light emitted by each pixel of the electroluminescent display by permitting adjustment in the intensity of individual color components of the emission.

The invention will be further appreciated in light of the following examples and comparative examples.

EXAMPLE 1 AND COMPARATIVE EXAMPLE 1

An electroluminescent device was fabricated from a gallium nitride (GaN) film grown on p-type (111) Si substrates by MBE with a Ga elemental source and a nitrogen plasma source. Rare earth doping with Tm from a solid source was performed in situ during growth of the GaN film. The GaN:Tm film was grown for about one hour at a substrate temperature of about 500° C. with a Tm cell temperature of about 580° C. under slightly N-rich growth conditions with 1.5 sccm for nitrogen ($N_2$) flow to the RF plasma source, which was operated at a plasma power of about 400 W. Though it is well accepted that Ga flux is critical to GaN crystalline quality and that good crystalline GaN is usually grown under slightly Ga-rich growth condition, a slightly N-rich growth condition is favorable for an electroluminescent emission. The resulting GaN:Tm film thickness was about 0.6 μm. A ring-shaped transparent electrode was fabricated on the GaN:Tm layer using indium-tin oxide (ITO) sputtering and a lift-off process to provide a device structure similar to that shown in FIGS. 1 and 2A–2B.

Figure 5:
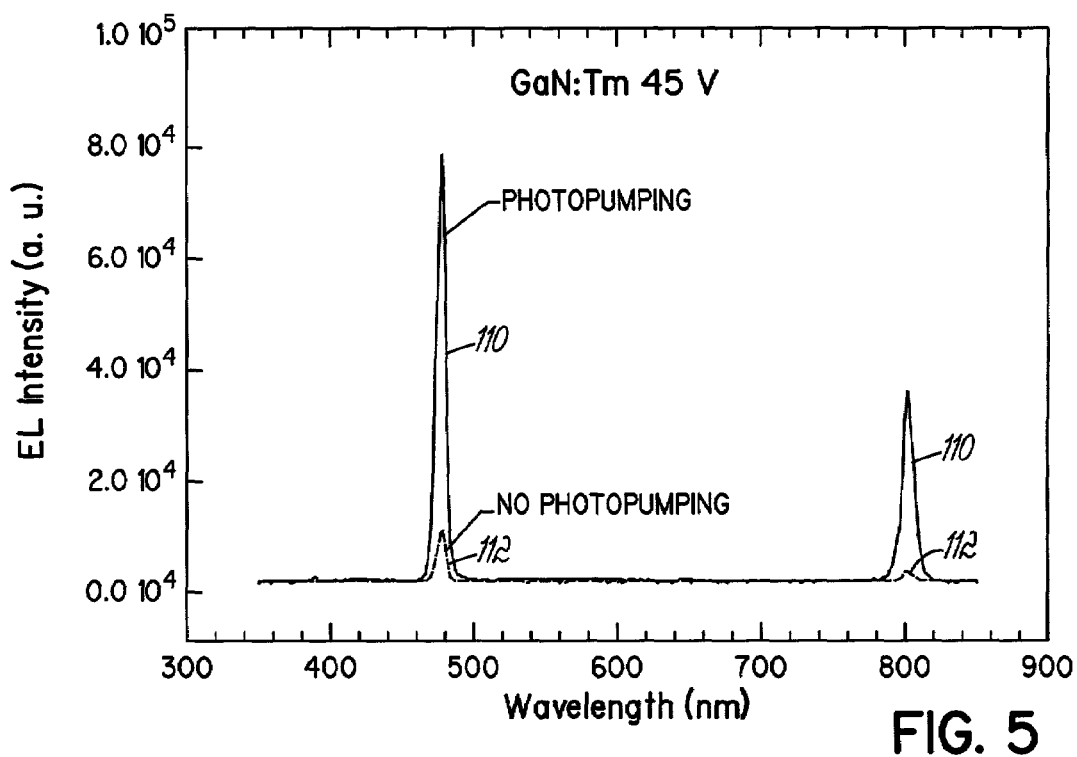
FIG. 5 is a graphical representation of an electroluminescence spectra of the light output by the electroluminescent device of FIG. 1, in which the semiconductor phosphor layer of the device is doped to emit blue light, acquired with photopumping applied and, as a comparative example, with photopumping absent.

With reference to FIG. 5, spectra resulting from electroluminescence measurements made on the GaN:Tm electroluminescent device with and without photopumping are graphically displayed. A bias potential was applied to the transparent electrode to produce light emission from the electroluminescent device centered about a peak emission wavelength of about 478 nm, which is believed to be due to the $^1G_4 \rightarrow {}^3H_6$ transition, and in the near infrared centered about a peak emission wavelength of about 802 nm which is believed to be due to the $^3F_4 \rightarrow {}^3H_6$ transition. In this example, spectrum 110 was obtained while photopumping according to the principles of the invention. Specifically, spectrum 110 was acquired while directing a radiation beam from a HeCd laser (operating at a wavelength of about 325 nm or about 3.8 eV) at a photopumping power of about 3.5 mW (or a power density of 2.8 W/cm$^2$) toward the electrode, which was DC-biased at about 45 volts. As a comparative example, another spectrum 112 was acquired with the electrode biased to a DC potential of about 45 volts but without photopumping with the HeCd laser.

It was observed, as is apparent from a comparison of spectrum 110 with spectrum 112, that photopumping according to the principles of the invention enhanced the intensity of the light emission measured at the peak emission wavelength by a factor of about 8 under the particular conditions of photopumping power and DC bias potential. It is also apparent from a comparison of spectrum 110 with spectrum 112 that the intensity enhancement is observed for the blue emission at 478 nm and also for emission in the near infrared at a wavelength of about 802 nm.

EXAMPLE 2 AND COMPARATIVE EXAMPLE 2

Figure 6:
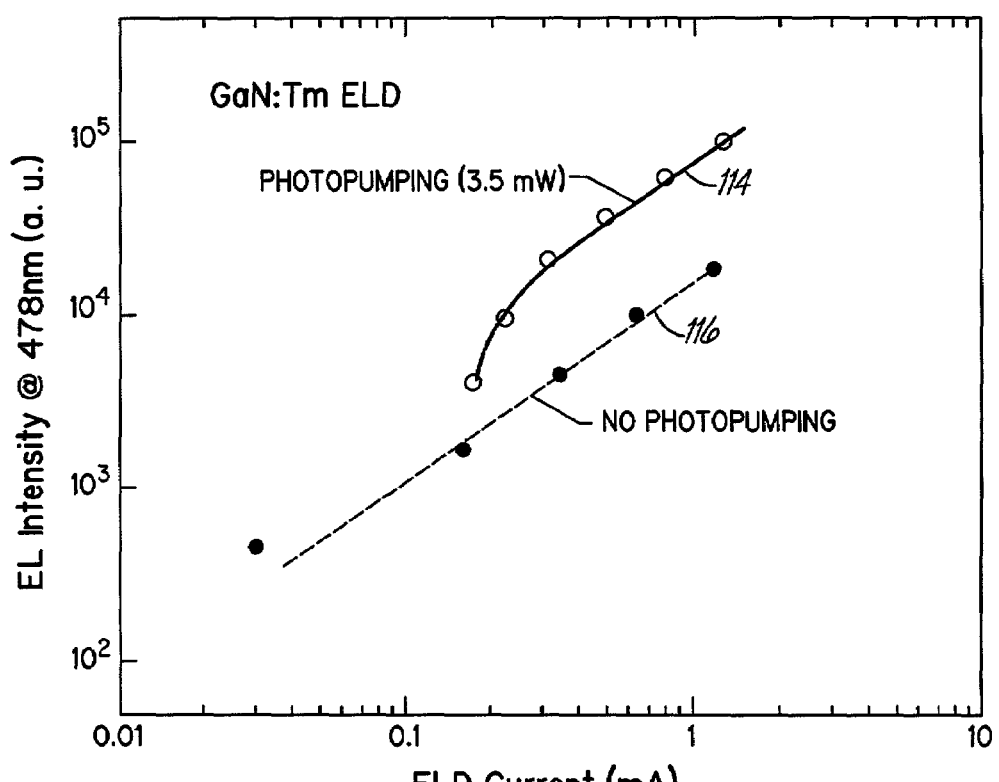
FIG. 6 is a graphical representation of electroluminescence intensity from the electroluminescent device of FIG. 1, in which the semiconductor phosphor layer of the device is doped to provide blue emission, as a function of device current acquired with photopumping applied and, as a comparative example, with photopumping absent.

With reference to FIG. 6, a graphical representation of electroluminescent intensity measured at the peak emission wavelength of about 478 nm is presented as a function of device current for the GaN:Tm electroluminescent device of Example 1. Specifically, the electroluminescence intensity at 478 nm was measured at various DC bias conditions with a photopumping power of 3.5 mW, as indicated by curve 114, and without photopumping, as indicated by curve 116.

It is apparent from FIG. 6 that stronger electroluminescence at 478 nm is observed at a given device current with photopumping (curve 114) than is observed without photopumping (curve 116). Because of the additional carrier electrons generated by photopumping, bias conditions at a given current differ when photopumping is present. Regardless of the device current, however, photopumping always provided stronger electroluminescent emission at a given device current, which indicates that photopumping improves the efficiency of the electroluminescent emission.

EXAMPLE 3 AND COMPARATIVE EXAMPLE 3

An electroluminescent device was fabricated from a gallium nitride (GaN) film grown on p-type (111) Si substrates by MBE with a Ga elemental source and a nitrogen plasma source. Rare earth doping with Er from a solid source was performed in situ during growth of the GaN film. The GaN:Er film was grown for about one hour at 550° C. with a Er cell temperature of 860° C. under slightly N-rich growth conditions with 1.5 sccm for nitrogen ($N_2$) flow to the RF plasma source, which was operated at a plasma power of about 400 W. The resulting GaN:Er film thickness was about 1.0 μm. A ring-shaped transparent electrode was fabricated on the GaN:Er layer using indium-tin oxide (ITO) sputtering and a lift-off process to provide a device structure similar to that shown in FIGS. 1 and 2A–2B.

Figure 7A:
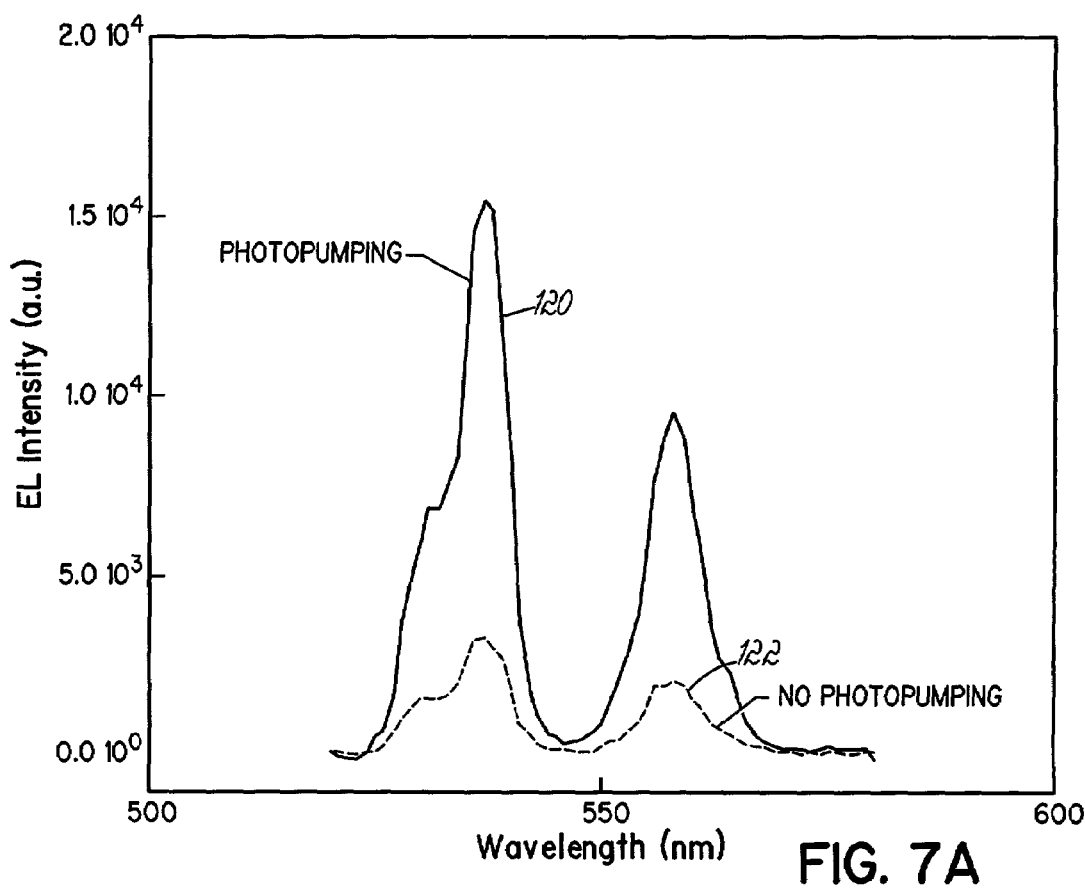
FIGS. 7A and 7B are graphical representations of an electroluminescence spectra of the light output by the electroluminescent device of FIG. 1, in which the semiconductor phosphor layer of the device is doped to provide green and infrared emission, acquired with photopumping applied and, as a comparative example, with photopumping absent.
Figure 7B:
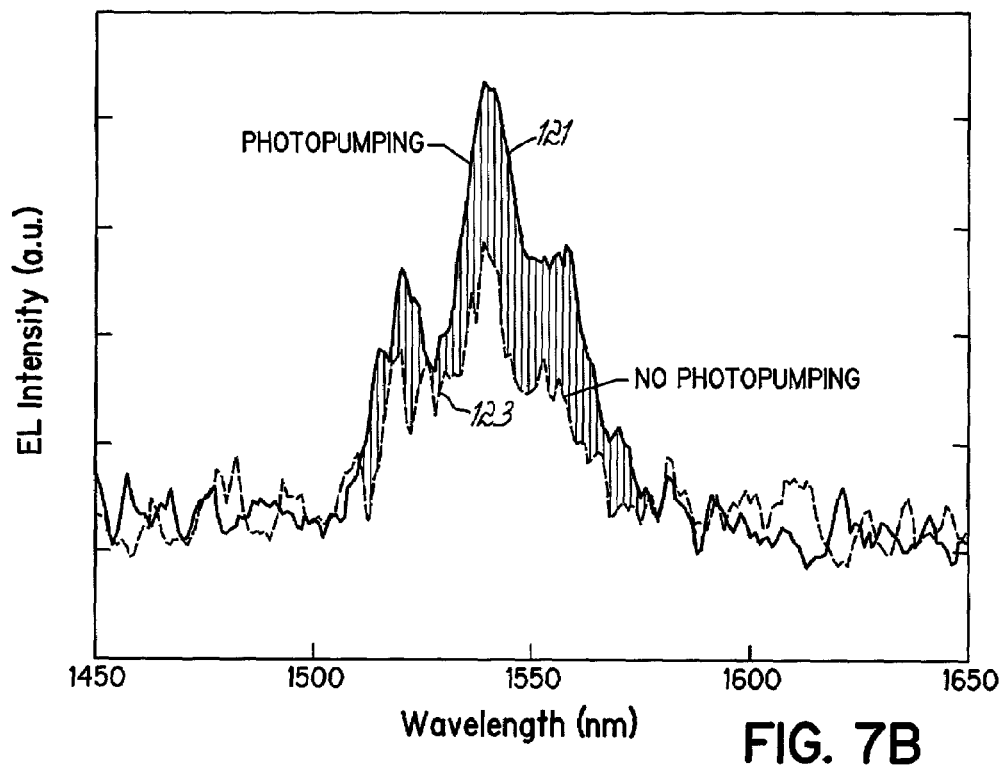

With reference to FIGS. 7A and 7B, spectra resulting from electroluminescence measurements made on the GaN:Er electroluminescent device are graphically displayed. A bias potential was applied to the transparent electrode to produce light emission from the electroluminescent device centered about two peak emission wavelengths of about 537 nm and about 558 nm, which are believed to be caused by two 4f—4f $Er^{3+}$ inner shell transitions: $^2H_{11/2} \rightarrow {}^4I_{15/2}$ and $^4S_{3/2} \rightarrow {}^4I_{15/2}$, respectively. Emission was also observed in the near infrared centered about a peak emission wavelength of about 1540 nm. Spectra 120, 121 were acquired while directing a radiation beam from an HeCd laser, according to the principles of the invention, at a photopumping power of about 28.7 mW toward the electrode, which was DC-biased at about 100 volts. As a comparative example, spectra 122, 123 were also acquired with the electrode also biased to a DC potential of about 45 volts but without photopumping using the HeCd laser.

It was observed, as is apparent from a comparison of spectrum 120 with spectrum 122, that photopumping according to the principles of the invention enhanced the intensity of the visible light emission by a factor of about 5 under the selected photopumping power and DC bias potential. It is also apparent from a comparison of spectrum 121 with spectrum 123 that an intensity enhancement of about a factor of two (or 100%) was also observed for infrared emission at 1540 nm.

EXAMPLE 4 AND COMPARATIVE EXAMPLE 4

Figure 8:
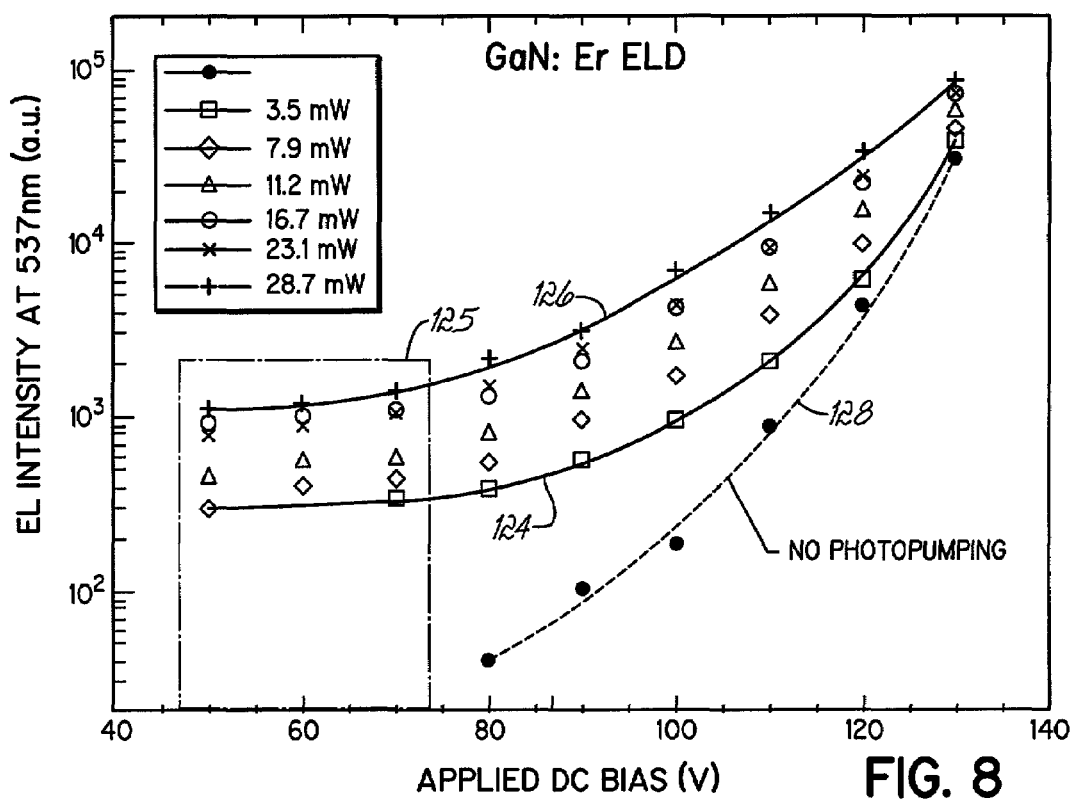
FIG. 8 is a graphical representation of electroluminescence intensity from the electroluminescent device of FIG. 1, in which the semiconductor phosphor layer of the device is doped to emit green light, as a function of applied bias potential for various photopumping powers.

With reference to FIG. 8, the electroluminescence peak intensity at 537 nm from the GaN:Er electroluminescent device of Example 3 is graphically displayed as a function of DC bias potential and photopumping power, according to the principles of the invention. Specifically, for various values of DC bias potential, the photopumping power was varied from 3.5 mW to 28.7 mW by filtering the output of the HeCd laser with a series of intensity filters. The peak intensity at 537 nm was measured from individual electroluminescence spectra acquired while holding the DC bias potential constant at 50 V and increasing the photopumping power. The DC bias potential was incremented by 10 V, held constant, and the photopumping power was again increased from 3.5 mW to 28.7 mW. The measurement process was repeated up to a DC bias potential of about 130 V.

As is apparent in FIG. 8, the peak electroluminescence intensity for all values of applied photopumping power and DC bias potential was bounded between curve 124, derived from electroluminescence measurements made at 3.5 mW of photopumping power, and curve 126, derived from electroluminescence measurements made at 28.7 mW of photopumping power. It is further apparent that the electroluminescence intensity increased monotonically with increasing photopumping power at a fixed DC bias potential. In addition, the electroluminescence intensity also increased with DC bias potential for all values of photopumping power.

As a comparative example, curve 128 represents the electroluminescence intensity at 537 nm as a function of DC bias potential with no applied photopumping. It is apparent from curve 128 that the electroluminescence intensity is significantly reduced at a given DC bias potential if photopumping is absent. It is also apparent from curve 128 that electroluminescent emission is insignificant at bias potentials less than about 80 V. However, as indicated by curves 124 and 126, significant light emission is detected in the presence of photopumping according to the principles of the invention at DC bias potentials less than about 80 V. The enhancement in the light emission provided by photopumping was proportionally larger at lower DC bias potentials and seemed to saturate at higher DC bias potentials (e.g., near 130 V).

With continued reference to FIG. 8, the GaN:Er electroluminescent device of Example 3 may be utilized as a photoresponsive device operating as an ultraviolet sensor or indicator. As a specific example, the GaN:Er electroluminescent device may be biased in a standby or quiescent mode biased with a bias potential range between about 50 volts and about 75 volts, contained in the boxed region 125, for which electroluminescent emission is absent or incapable of being perceived in the absence of photopumping. If the biased GaN:Er electroluminescent device is exposed to radiation of an ultraviolet wavelength (e.g., photons having an energy greater than the GaN band gap of 3.4 eV), the electroluminescent device will be photopumped consistent with the principles of the invention. The photopumping occurs for a photopumping power as small as 3.5 mW or less. The exposure to the ultraviolet radiation causes green emission from the biased GaN:Er electroluminescent device that is visible to an observer and serves as an indication of the presence of ultraviolet light, which would otherwise be invisible.

As a specific example, the GaN:Er electroluminescent device may be placed in an environment susceptible to the occurrence of visually imperceptible radiation and electrically biasing to a bias potential insufficient to produce visually perceptible light emission. When the occurrence of visually imperceptible radiation stimulates light emission from the electroluminescent device, an observer in the environment is alerted visually by the light emission. It is contemplated by the invention that other semiconductor phosphors are applicable for use in an electroluminescent device operating as an ultraviolet indicator.

EXAMPLE 5 AND COMPARATIVE EXAMPLE 5

Figure 9:
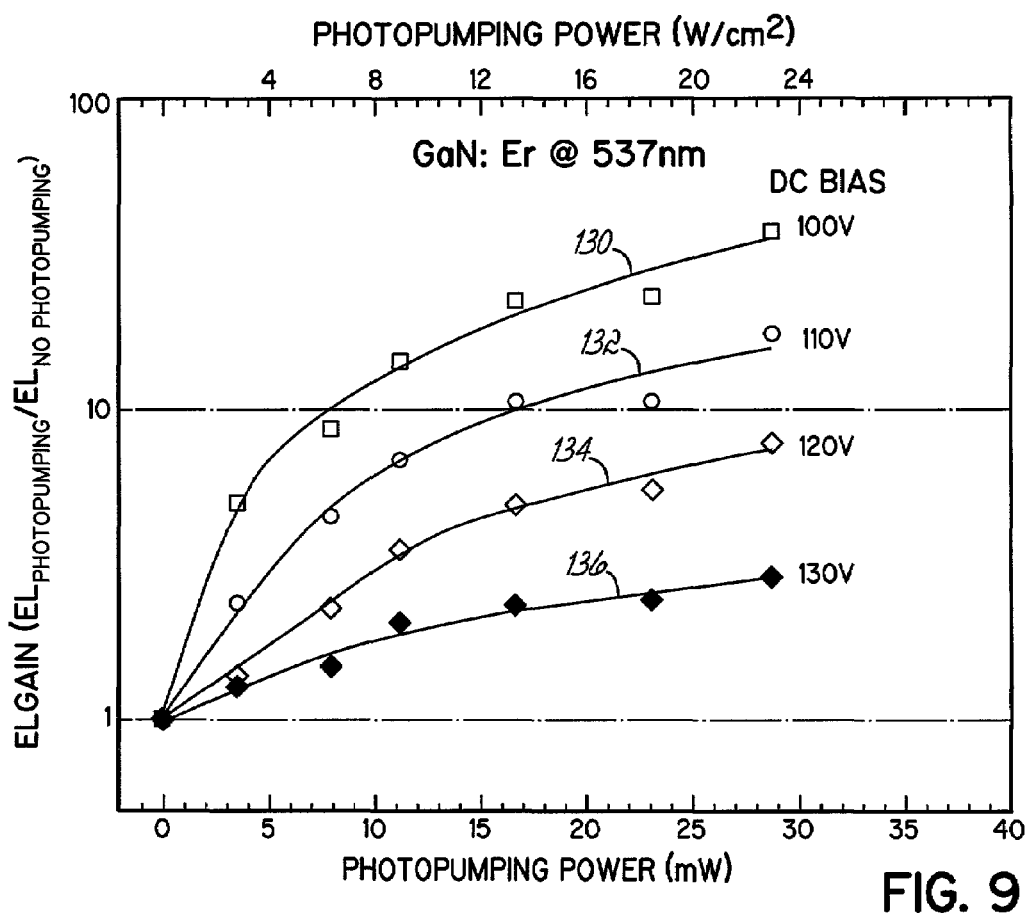
FIG. 9 is a graphical representation of the device gain from the electroluminescent device of FIG. 1, in which the semiconductor phosphor layer of the device is doped to provide green emission, as a function of photopumping power for various applied bias potentials.

With reference to FIG. 9, the device gain for the electroluminescence peak intensity at 537 nm emitted by the GaN:Er electroluminescent device of Example 3 is graphically displayed as a function of photopumping power for various DC bias potentials. The information presented in FIG. 9 is derived from the information displayed in FIG. 8 and represents the electroluminescence intensity at 537 nm for various photopumping powers normalized by the corresponding electroluminescence intensity at 537 nm observed with photopumping absent. Curves 130, 132, 134 and 136 represent the gain observed for DC bias potentials of 100 V, 110 V, 120 V and 130 V, respectively, as the photopumping power is increased incrementally from 3.5 mW to 28.7 mW.

It is apparent from curves 130–136 that the device gain increased monotonically with increasing photopumping power for all DC bias potentials. The largest device gain of about 40 was observed in curve 130 for a DC bias potential of 100 V and a photopumping power of 28.7 mW. It is also observed that the device gain is greater at relatively lower DC bias potentials. For example, at the maximum photopumping power of 28.7 mW, the device gain decreased from about 40 to about 3 as the DC bias potential was increased from 100 V to 130 V.

EXAMPLE 6 AND COMPARATIVE EXAMPLE 6

Figure 10:
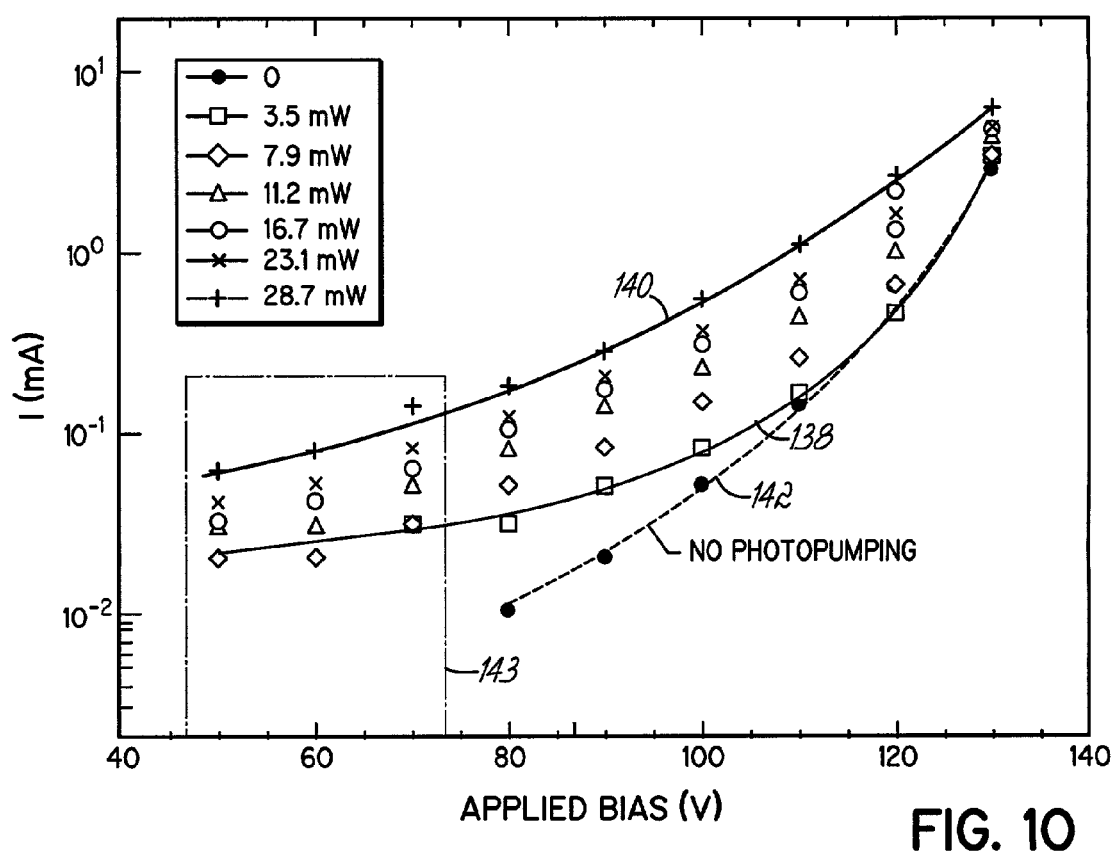
FIG. 10 is a graphical representation of electroluminescence intensity from the electroluminescent device of FIG. 1, in which the semiconductor phosphor layer of the device is doped to emit green light, as a function of device current acquired with photopumping applied and, as a comparative example, with photopumping absent.

With reference to FIG. 10, the electroluminescence intensity from the GaN:Er electroluminescent device of Example 3 is graphically presented as a function of device current. The device current for all values of applied photopumping power and DC bias potential was bounded between curve 138, derived from electroluminescence measurements made at 3.5 mW of photopumping power, and curve 140, derived from electroluminescence measurements made at 28.7 mW of photopumping power. It is apparent that the device current increased monotonically with increasing photopumping power at a fixed DC bias potential and that the device current also increased with DC bias potential for all values of photopumping power. Curve 142 shows comparative measurements of the electroluminescence intensity acquired from the GaN:Er electroluminescent device of Example 3 with photopumping absent.

It is apparent from FIG. 10 that the GaN:Er electroluminescent device of Example 3 may be utilized as a photoresponsive device operating as a quantitative ultraviolet detector. In a bias potential range of about 50 V to about 75 V contained in a boxed region 143, the device current was observed to have a significant dependence on the presence of photopumping. In this specific bias potential range, the device current was relatively insignificant (i.e., in the $\mu A$ range) in the absence of photopumping. However, photopumping according to the invention increases the device current by one to two orders of magnitude. As a result, the GaN:Er electroluminescent device can be used to quantitatively measure ultraviolet power by sensing variations in the device current. It is appreciated that other semiconductor phosphors of the invention are applicable for use in an electroluminescent device operating as a quantitative ultraviolet detector.

While the invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A light-emissive device comprising:
   an electroluminescent layer including a wide band-gap semiconductor doped with a light-emitting element in a concentration effective to provide light emission of photons at a first wavelength and with an intensity when electrically biased; and
   a radiation source adapted to provide photons at a second wavelength to said electroluminescent layer at a power effective to increase the intensity of the the photons emitted at the first wavelength from said light-emitting element.

2. The light-emissive device of claim 1 further comprising:
   a substrate carrying said electroluminescent layer, wherein said substrate is formed from a material selected from the group consisting of gallium nitride, silicon, silicon carbide, glass, quartz, sapphire, alumina, and titania.

3. The light-emissive device of claim 1 wherein said light-emitting element is selected from the group consisting of elements from the Lanthanide Series of the Periodic Table and elements from the Transition Metal Series of the Periodic Table.

4. The light-emissive device of claim 1 wherein said wide band-gap semiconductor is a material selected from a group consisting of III-V compounds, II-VI compounds, and IV-IV compounds.

5. The light-emissive device of claim 1 wherein said wide band-gap semiconductor is an alloy of at least two semiconductor materials having an effective band gap sufficient for visible light emission.

6. The light-emissive device of claim 1 wherein said wide band-gap semiconductor is gallium nitride and said dopant is selected from the group consisting of cerium, praseodymium, neodymium, samarium, europium, gadolinium, terbium, dysprosium, holmium, erbium, thulium, and ytterbium.

7. The light-emissive device of claim 1 wherein said wide band-gap semiconductor is selected from a group consisting of gallium nitride, aluminum nitride, gallium phosphide, cadmium sulfide, zinc telluride, zinc sulfide, zinc oxide, zinc selenide, strontium sulfide, calcium sulfide, and silicon carbide.

8. The light-emissive device of claim 1 further comprising:
   an optically-transmissive electrode formed on said electroluminescent layer, said radiation source oriented to provide the photons at the second wavelength to said electroluminescent layer through said optically-transmissive electrode; and
   a source of bias potential electrically coupled to said electrode for supplying a bias potential to said electrode effective to produce light emission of photons at the first wavelength from said light-emitting element of said electroluminescent layer.

9. The light-emissive device of claim 8 wherein said source of bias potential is operative to provide a direct current bias potential.

10. The light-emissive device of claim 1 wherein the photons from said radiation source have a photon energy larger than the band gap of the wide band-gap semiconductor.

11. The light-emissive device of claim 10 wherein the photon energy of the photons from said radiation source is greater than about 3.1 eV.

12. The light-emissive device of claim 1 wherein the concentration of said light-emitting element is about 0.1 atomic percent to about 10 atomic percent.

13. A light-emissive device comprising:
    first and second electrodes, at least one of said first and second electrodes being optically transmissive;
    an electroluminescent layer disposed between said first and second electrodes, said electroluminescent layer including a wide band-gap semiconductor doped with a light-emitting element in a concentration effective to provide light emission;
    a source of bias potential electrically coupled to said first and second electrodes for supplying a bias potential effective to produce light emission of photons at a first wavelength and with an intensity from said light-emitting element of said electroluminescent layer, the photons emitted at the first wavelength being transmitted through the optically transmissive one of said first and second electrodes; and
    a radiation source adapted to provide photons at a second wavelength to said electroluminescent layer at a power effective to increase the intensity of the photons emitted at the first wavelength from said light-emitting element.

14. The light-emissive device of claim 13 further comprising a substrate carrying said first and second electrodes and said electroluminescent layer, wherein said substrate is formed from a material selected from the group consisting of gallium nitride, silicon, silicon carbide, glass, quartz, sapphire, alumina, and titania.

15. The light-emissive device of claim 13 wherein said light-emitting element is selected from the group consisting of elements from the Lanthanides Series of the Periodic Table and elements from the Transition Metal Series of the Periodic Table.

16. The light-emissive device of claim 13 wherein said wide band-gap semiconductor is a material selected from a group consisting of III-V compounds, II-VI compounds, and IV—IV compounds.

17. The light-emissive device of claim 13 wherein said wide band-gap semiconductor is gallium nitride and said dopant is selected from the group consisting of cerium, praseodymium, neodymium, samarium, europium, gadolinium, terbium, dysprosium, holmium, erbium, thulium, and ytterbium.

18. The light-emissive device of claim 13 wherein said wide band-gap semiconductor is selected from a group consisting of gallium nitride, aluminum nitride, gallium phosphide, cadmium sulfide, zinc telluride, zinc sulfide, zinc oxide, zinc selenide, strontium sulfide, calcium sulfide, and silicon carbide.

19. The light-emissive device of claim 13 wherein said wide band-gap semiconductor is an alloy of at least two semiconductor materials having an effective band gap sufficient for visible light emission.

20. The light-emissive device of claim 13 wherein the photons from said radiation source have a photon energy larger than a band gap of the wide band-gap semiconductor.

21. The light-emissive device of claim 20 wherein the photon energy of the photons from said radiation source is greater than about 3.1 eV.

22. The light-emissive device of claim 13 wherein the concentration of said light-emitting element is about 0.1 atomic percent to about 10 atomic percent.

23. The light-emissive device of claim 13 wherein said source of a bias potential is operative to provide an alternating current bias potential.

24. The light-emissive device of claim 13 wherein said second wavelength is in the ultraviolet portion of the electromagnetic spectrum.

25. The light-emissive device of claim 13 wherein said photons at the second wavelength are provided to said electroluminescent layer through the optically transmissive one of said first and second electrodes.

26. The light-emissive device of claim 13 further comprising a waveguide structure having an inlet port and an outlet port, said inlet port optically coupled with said radiation source and said outlet port optically coupled with said electroluminescent layer, said waveguide transferring radiation from said radiation source to said electroluminescent layer.

27. The light-emissive device of claim 26 where said first electrode is optically transmissive, and further comprising:
a dielectric layer disposed between said electroluminescent layer and said first electrode, wherein said waveguide transfers radiation to said electroluminescent layer through said dielectric layer and said first electrode.

28. The light-emissive device of claim 26 further comprising:
a substrate carrying said first and second electrodes and said electroluminescent layer, said first electrode being coextensive with the substrate, and wherein said waveguide structure further comprises a dielectric layer disposed between said first electrode and said electroluminescent layer, said dielectric layer capable of transferring radiation from said radiation source to said electroluminescent layer.

29. A light-emissive device comprising:
first, second and third electrodes, said second and third electrodes being optically transmissive;
a first electroluminescent layer disposed between said first and second electrodes;
a second electroluminescent layer disposed between said first and third electrodes;
a source of bias potential electrically coupled to said first, second and third electrodes for supplying respective bias potentials effective to produce light emission from said first and said second electroluminescent layers;
a radiation source providing radiation at a power effective to increase the intensity of the light emission from said first and said second electroluminescent layers;
a dielectric layer disposed between said first electrode and said first and said second electroluminescent layers, said dielectric layer capable of transferring radiation from said radiation source to said first and second electroluminescent layers; and
a blocking layer disposed between said dielectric layer and said first and said second electroluminescent layers, said blocking layer operative to prevent the passage of radiation from said dielectric layer to said first electroluminescent layer and operative to permit the passage of radiation from said dielectric layer to said second electroluminescent layer.

30. The light-emissive device of claim 29 wherein said blocking layer includes an opening positioned to allow the transfer of radiation from said dielectric layer to said second electroluminescent layer.

31. The light-emissive device of claim 29 wherein said dielectric layer is formed of a material having a higher refractive index than a material forming said first electrode and having a higher refractive index than a material forming the blocking layer.

32. A flat panel display comprising:
a substrate;
a first electrode formed on said substrate;
a plurality of optically-transmissive second electrodes arranged laterally in a matrix array;
a plurality of semiconductor phosphor layers each disposed between a corresponding one of said second electrodes and said first electrode, each of said semiconductor phosphor layers including a wide band-gap semiconductor doped with a light-emitting element in a concentration effective to provide light emission transmitted through the corresponding one of said second electrodes;
a source of bias potential electrically coupled to said first electrode and to said plurality of second electrodes for supplying a bias potential effective to produce light emission from said light-emitting element of each of said semiconductor phosphor layers; and
a radiation source providing radiation to at least one of said semiconductor phosphor layers through the corresponding one of said optically-transmissive second electrodes at a power effective to increase the intensity of the light emission from said light-emitting element thereof.

33. The flat panel display of claim 32 wherein the radiation from said radiation source has a photon energy larger than a band gap of the wide band-gap semiconductor.

34. The flat panel display of claim 33 wherein the photon energy of the radiation from said radiation source is greater than about 3.1 eV.

35. The flat panel display of claim 32 wherein the concentration of said light-emitting element is about 0.1 atomic percent to about 10 atomic percent.

36. The flat panel display of claim 32 wherein said source of a bias potential is operative to provide an alternating current bias potential.

37. The flat panel display of claim 32 wherein said radiation source emits radiation having a wavelength in the ultraviolet portion of the electromagnetic spectrum.

38. The flat panel display of claim 32 wherein said beam of radiation from said radiation source is provided to said at least one of said semiconductor phosphor layers through the corresponding one of said second electrodes.

39. The flat panel display of claim 32 further comprising:
a waveguide structure having an inlet port and an outlet port, said inlet port optically coupled with said radiation source and said outlet port optically coupled with said at least one of said semiconductor phosphor layers, said waveguide transferring radiation from said radiation source to said at least one of said semiconductor phosphor layers.

40. The flat panel display of claim 39 further comprising:
a dielectric layer disposed between said semiconductor phosphor layers and said first electrode, wherein said waveguide transfers radiation from said radiation source to said at least one of said semiconductor phosphor layers through said dielectric layer and the corresponding one of said optically-transmissive second electrodes.

41. The flat panel display of claim 39 wherein said waveguide structure further comprises a dielectric layer disposed between said first electrode and said semiconductor phosphor layers, said dielectric layer capable of transferring radiation from said radiation source to said at least one of said semiconductor phosphor layers.

42. The flat panel display of claim 41 further comprising:
a blocking layer disposed between said dielectric layer and said semiconductor phosphor layers, said blocking layer preventing loss of radiation from said dielectric layer and having an opening operative to permit the passage of radiation from said dielectric layer to said at least one of said semiconductor phosphor layers.

* * * * *

UNITED STATES PATENT AND TRADEMARK OFFICE
CERTIFICATE OF CORRECTION

PATENT NO. : 6,972,516 B2
APPLICATION NO. : 10/172294
DATED : December 6, 2005
INVENTOR(S) : Steckl et al.

It is certified that error appears in the above-identified patent and that said Letters Patent is hereby corrected as shown below:

ON THE TITLE PAGES: Item (56) OTHER PUBLICATIONS
Page 2, column 2, line 7, change "Letyters"" to --Letters--.

IN THE SPECIFICATION:
Column 6, line 38, change "lift-off" to --lift off--.
Column 17, line 3, change "Lanthanides" to --Lanthanide--

Signed and Sealed this

Twenty-second Day of August, 2006

JON W. DUDAS
*Director of the United States Patent and Trademark Office*